United States Patent

[11] 3,540,557

[72] Inventors Roland E. Hasselbacher
Brimfield;
Franklin O. Koch, Jr., Edelstein, Illinois
[21] Appl. No. 811,774
[22] Filed April 1, 1969
[45] Patented Nov. 17, 1970
[73] Assignee Caterpillar Tractor Co.
Peoria, Illinois
a corporation of California

[54] FLUID PRESSURE BOOSTER FOR SEQUENTIALLY RELEASING CLUTCH AND ENGAGING BRAKE
7 Claims, 2 Drawing Figs.
[52] U.S. Cl. .................................................. 192/18,
192/91; 188/264; 192/113
[51] Int. Cl. .................................................. F16d 67/04
[50] Field of Search ........................................ 192/12.1,
18.1, 91A

[56] References Cited
UNITED STATES PATENTS

| | | | |
|---|---|---|---|
| 2,564,281 | 8/1951 | Rockwell.................... | 192/91AX |
| 2,901,066 | 8/1959 | Garmager.................... | 192/91AX |
| 3,314,513 | 4/1967 | Lake et al. ................... | 192/18.1X |

FOREIGN PATENTS

| | | | |
|---|---|---|---|
| 765,330 | 3/1934 | France ........................ | 192/91A |

*Primary Examiner—* Benjamin W. Wyche III
*Attorney—* Fryer, Tjensvold, Feix, Phillips and Lempio

ABSTRACT: A disc-type, oil-cooled clutch having a servo boost apparatus controlled by a plurality of slave cylinders and an operator actuated master control cylinder. Actuation of the master cylinder causes the clutch pressure plates to be disengaged and a clutch brake to be engaged due to a pressurization of a variable-volume chamber between the slave cylinders and the throwout bearing.

Patented Nov. 17, 1970

3,540,557

INVENTORS
ROLAND E. HASSELBACHER
FRANKLIN O. KOCH, JR.

BY

ATTORNEYS 3,540,557

FLUID PRESSURE BOOSTER FOR SEQUENTIALLY RELEASING CLUTCH AND ENGAGING BRAKE

BACKGROUND AND SUMMARY OF THE INVENTION

This invention relates generally to a hydraulically controlled and boosted flywheel clutch for a bus or truck-type vehicle.

The traditional design for a heavy-duty clutch has normally been a dry face-type pressure plate clutch, which normally proves to be subject to rapid wear, over-heating, fading, and in need of adjustment at frequent intervals under normal operating conditions. Currently available mechanically controlled brakes of this type also make it difficult for the operator to determine when the rotating parts are stopped for shifting.

Attempts have been made to improve the action of the clutch by using hydraulically operated pistons which move conventional pressure plate linkages, while stopping the rotating members of the clutch and output shaft by mechanically operated brakes. Many of these clutches have been manufactured with different materials utilized in the clutch discs in experiments attempting to reduce the wear in the clutch area. Some clutches have been provided with simplified means for making necessary adjustments from the outside of the housing. A few designs have been produced which utilize the rotating inertia of the clutch parts to activate a spiral thread for boosting the linkage to the clutch.

In spite of all these attempted improvements, the wear problem has persisted, linkage adjustments still plague service personnel and industry still requires a design which combines a clutch having long service life, an arrangement for stopping rotating parts in order to improve transient gear shifting, cooling and longer life expectancy for the clutch members, and an operator "feel" for the different phases of clutch and braking operations.

In this invention, a disc-type clutch has been designed in one compact and sealed compartment which is continuously cooled by an oil spray and which utilizes clutch discs with cork material which, when lubricated and cooled in this continuous manner, suffer virtually no wear. What little wear does occur in the clutch package or in the adjoining linkage is automatically compensated for by a change in the volume of hydraulic fluid in the passages, thus eliminating all need for linkage adjustment.

As a further feature of the invention, the boosting elements of the design are clustered in a compact manner around the output shaft. The action of the clutch brake is designed to take place at a predetermined position of the operator's clutch pedal relative to clutch disengagement. Further, the clutch brake is lubricated and cooled by fluid and remains in a ready position slightly disengaged, and all slack in the linkage path is eliminated.

Thus, the design of the present invention is preferable to the prior designs because it provides a continuous cooling of all heat-producing parts in a properly sequenced clutch brake which stops all rotating parts and gives an associated operator "feel" of this clutch-to-brake action. Also, the invention provides a clutch disengagement throwout motion primarily through hydraulic pressure forces as opposed to operator effort. A clean package is provided with all of the necessary control components located in a remote area and a compact internal arrangement which has long service life without requiring periodic adjustment.

Therefore, it is an object of this invention to provide an improved clutch with integral booster.

It is also an object hereof to provide such a clutch which does not require periodic adjustment.

It is also an object hereof to provide a clutch in which all the heat-producing parts are continuously cooled.

It is a further object hereof to provide a properly sequenced clutch brake which stops all rotating parts.

It is a still further object of this invention to provide such a clutch brake which produces an operator "feel" for the cessation of rotation of the parts.

It is also an object hereof to provide a clutch brake which is continuously cooled by an oil spray.

It is a further object hereof to provide such a clutch wherein the discs are lubricated and cooled in a continuous manner.

It is a still further object of this invention to provide a clutch in which any wear occurring is automatically compensated for by means within the clutch.

It is also an object hereof to provide a clutch brake requiring only a minimum of operator exertion.

Other objects and advantages of the present invention will become apparent from the following description and claims as illustrated in the accompanying drawing which, by way of illustration, shows a preferred embodiment of the present invention and principles thereof and what is now considered to be the best mode contemplated for applying these principles. It is recognized that other embodiments of the invention utilizing the same or equivalent principles may be used, and structural changes may be made as desired by those skilled in the art, without departing from the present invention and purview of the appended claims.

DETAILED DESCRIPTION

Figure 1:
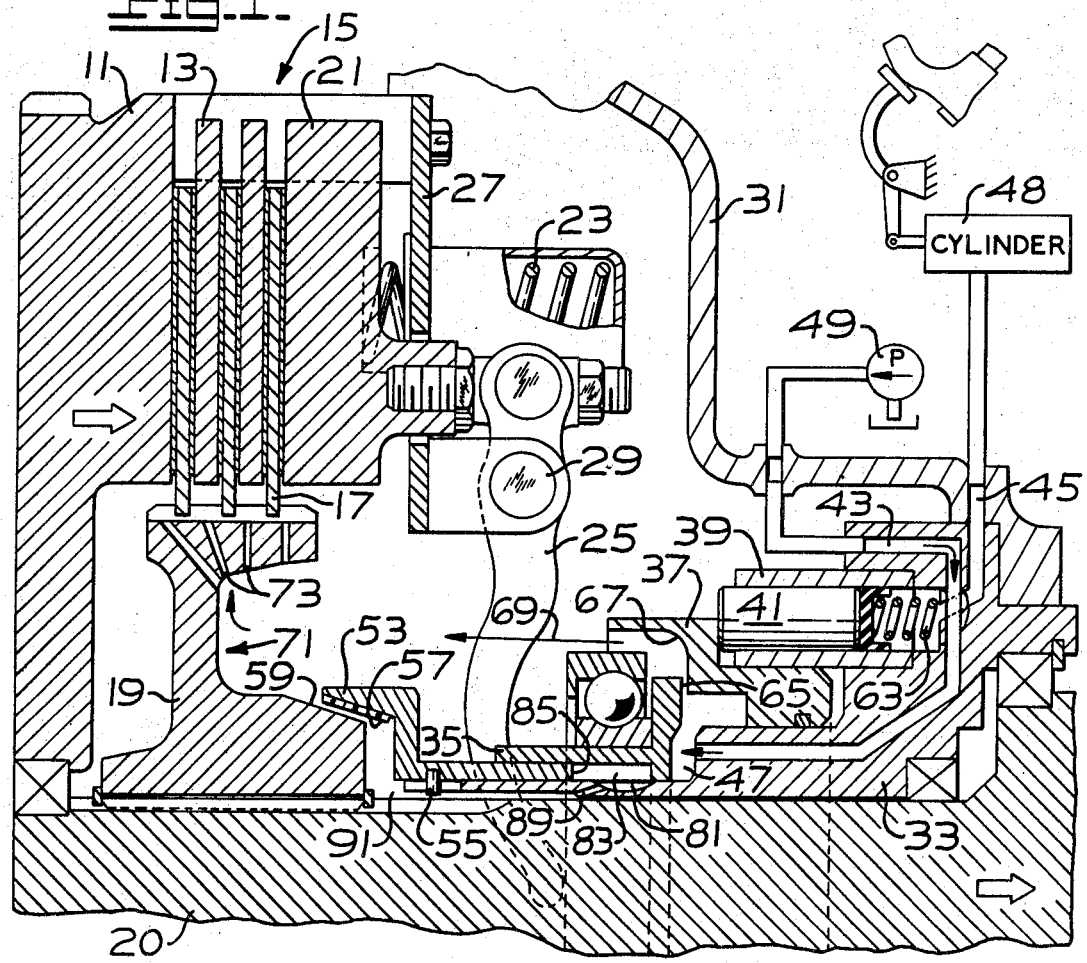
FIG. 1 is a partial sectional-schematic illustration of the clutch brake of the instant invention.
Figure 2:
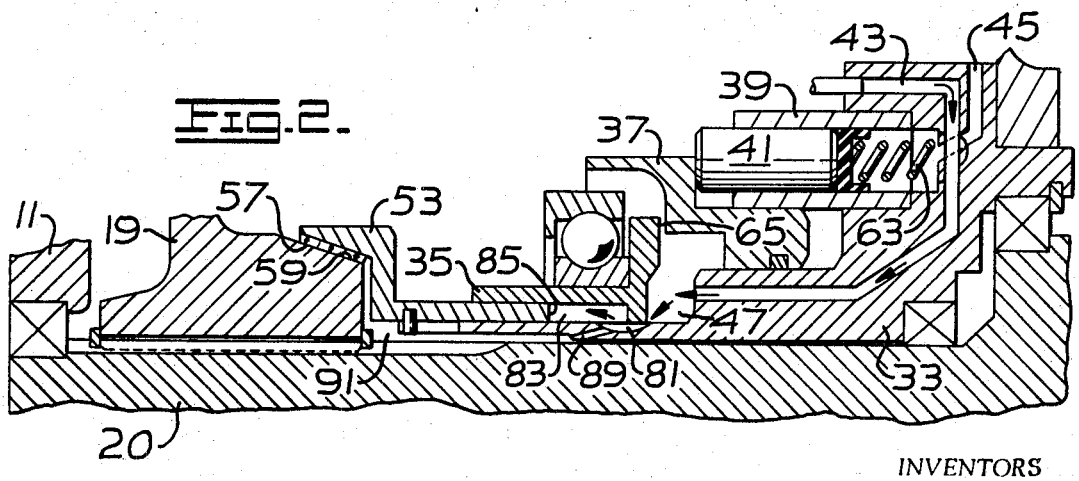
FIG. 2 is a view of a portion of FIG. 1, with the brake actuated.

As shown in FIG. 1, input torque to the invention is supplied to a torque input means flywheel 11 having metal reaction plates 13 thereon. The metal reaction plates 13, which are the first section part of a conventional disc-type rotating clutch generally indicated at 15, transfer the torque, when the clutch is actuated, via cork-faced discs 17 to a second section or clutch hub 19. The clutch hub is mounted by suitable means, such as splines, on the shaft or torque output means 20. Of course, if desired, material other than cork could be used on the discs 17.

In normal operation, the plates 13 and discs 17 are engaged in a driving relationship by a pressure plate 21 which is biased by a series of compression springs or biasing means one of which is shown at 23. The clutch may be mechanically disengaged by a plurality of throwout levers 25 which are mounted so as to pivot on the clutch cover plate 27 at pivot point 29. As the throwout levers 25 are pivoted clockwise about pivot 29, the pressure plate 21 is withdrawn from the discs and plates against the biasing force of springs 23.

A bell housing 31 serves as an outer envelope for the clutch brake system and also as an intermediate support between the engine and the transmission. A support 33 is grounded to the right end of the bell housing and supports a bearing carrier 35, a collar 37, a plurality of slave cylinders 39 having piston 41 therein, and fluid conduits 43 and 45.

The conduit 43 supplies fluid to a variable-volume chamber 47 between the bearing carrier 35 and the collar 37, from a fluid pump source 49. Conduit 45 supplies fluid under pressure from the master brake cylinder 48 to the slave cylinders 39.

The support 33 also carries a clutch brake piston 53 having rotational stops 55. A mating brake surface 57 is situated on the brake piston 53 so that, when actuated, it acts upon a second section brake surface 59 of the clutch hub 19.

A spring 63 in each of the slave cylinders 39 serves to bias the pistons 41 such that collar 37 is positioned as far to the left as possible during the normal driving mode. This causes bearing carrier or actuating means 35 to be similarly positioned to the left in a manner to be described. The pressure of the fluid in chamber 47 causes the maintenance of a variable-width gap 65 between the collar 37 and bearing carrier 35. Spring force 63 and pressure in chamber 47 serve to position the linkage to insure a "no slack" positioning thereof without adversely affecting normal engagement of the clutch.

Flow from the chamber 47, through gap 65, is turned by the inner contour 67 of collar 37 such that it follows the direction illustrated by arrow 69. The fluid then passes the throwout levers 25 to strike the clutch hub web at 71 where, under the influence of centrifugal force, it passes through passages 73 in the clutch hub to cool the friction surfaces.

As will be obvious, the forces tending to move bearing carrier 35 and collar 37 to the left will be balanced at a certain point by the force of compression springs 23 acting through throwout levers 25.

When master cylinder 48 is actuated by suitable linkage, pressure will build up in cylinders 39 causing piston 41 to force collar 37 to the left, tending to close gap 65. As the pressure in chamber 47 builds up, bearing carrier 35 will overcome the force exerted by the compression springs 23, drawing pressure plate 21 toward the right to disengage the discs and plates.

A further buildup of pressure in slave cylinders 39 causes the bearing carrier 35 to uncover a plurality of peripherally located slots 81 in support 33. Fluid in chamber 47 passes through the slots 81 into a chamber 83 and acts against a surface 85 of clutch brake piston 53. This causes the clutch brake piston to move toward the left until braking surface 57 contacts the mating surface 59, causing the clutch hub 19 and output shaft 20 to stop rotating.

The vehicle transmission is thus prepared for a gear shift. At the moment the carrier 35 uncovers slots 81, the operator will feel an associated load release at his foot control pedal or other linkage, which indicates that the braking actuation in the clutch is taking place.

Pressure in the chamber 47 will also cause oil flow through a plurality of calibrated orifices 89 and passages 91 at a predetermined rate to insure adequate cooling of the brake surfaces while the brake clutch is applied.

When the pistons 41 are permitted to move back to the right within the slave cylinders 39, the force of the engaging clutch linkage will move all of the associated members to the normal position and flow will be denied to chamber 83, allowing the brake to be released.

Thus the Applicants have provided a new and improved clutch with an integral booster, which will result in a true advancement of the art due to its compact design, decrease of part wear, and freedom from the requirement of periodic adjustments. Although a single embodiment has been illustrated and described herein, the scope of the subsequent claims is such that those skilled in the art may make many alterations and modifications without exceeding the bounds of the invention as set forth therein.

We claim:

1. In a clutch having a first section mounted on a torque input means, a second section mounted on a torque output means, and biasing means maintaining the first and second sections in operative engagement, a brake surface on the second section, a piston actuatably mounted relative to the second section and having a mating brake surface for cooperation with the second section brake surface, an actuating means mounted adjacent the piston, means cooperating with the actuating means for disengaging the first and second sections, motivating means for causing the actuating means to actuate the disengaging means, and means cooperating with the actuating means for allowing the motivating means to exert a pressure on the piston only after the actuating means has been motivated a predetermined amount.

2. The clutch of claim 1 wherein the means for allowing the exertion of a pressure on the piston includes a fluid metering groove which is opened when the actuating means is motivated the predetermined amount.

3. The clutch of claim 2 including means for providing a flow of fluid to the cooperating brake surfaces for cooling them when the piston is actuated.

4. The clutch of claim 1 wherein the motivating means includes a chamber having a variable volume and partially bounded by the actuating means and a movable, operator-actuated means, a variable gap forming a fluid outlet between the actuating means and the movable means, and means for providing fluid to the chamber.

5. The clutch of claim 4 including means associated with the operator-actuated means and the second section for providing a flow of fluid to the friction surfaces of the first and second sections for cooling them.

6. The clutch of claim 4 wherein a metering groove provides a second fluid outlet from the chamber, the metering groove situated so as to be opened by the actuating means when the gap becomes partially closed by movement of the operator-actuated means.

7. The clutch of claim 6 including means in the metering groove for providing cooling fluid to the brake surfaces when the piston is actuated.